US006717894B2

(12) United States Patent
Kawashima (10) Patent No.: US 6,717,894 B2
(45) Date of Patent: Apr. 6, 2004

(54) OPTICAL DISC RECORDING METHOD AND RECORDING AND/OR REPRODUCING APPARATUS OPERABLE TO ACCOMMODATE MULTIPLE DISC FORMATS (75) Inventor: Tetsuji Kawashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/353,611

(22) Filed: Jan. 29, 2003

(65) Prior Publication Data
US 2003/0112721 A1 Jun. 19, 2003

Related U.S. Application Data (62) Division of application No. 09/789,067, filed on Feb. 20, 2001, now Pat. No. 6,621,776.

(30) Foreign Application Priority Data

Feb. 22, 2000 (JP) ........................................ 2000-050520

(51) Int. Cl.⁷ ................................................ G11B 7/00
(52) U.S. Cl. ................................. 369/44.29; 369/53.12
(58) Field of Search .......................... 369/44.26, 44.27, 369/44.29, 44.31, 44.35, 44.39, 44.41, 47.55, 53.12, 47.14, 53.15, 53.23, 53.28, 53.37

(56) References Cited

U.S. PATENT DOCUMENTS

| 4,949,326 A | | 8/1990 | Takagi et al. | |
|---|---|---|---|---|
| 5,708,636 A | * | 1/1998 | Takahashi et al. | ........ 369/44.41 |
| 6,084,843 A | * | 7/2000 | Abe et al. | ............... 369/112.07 |
| 6,366,543 B2 | * | 4/2002 | Uemura et al. | .......... 369/44.29 |

* cited by examiner

Primary Examiner—Phil W. Huber
(74) Attorney, Agent, or Firm—Frommer Lawrence & Haug LLP; William S. Frommer; Bruno Polito (57) ABSTRACT

A recording and/or reproducing apparatus for recording and/or reproducing data on or from an optical disc, in which the tracking error signal format for a recordable optical disc differs from that for a replay-only optical disc. The recording and/or reproducing apparatus includes a read-out processing unit for reading out data from the optical disc, a write processing unit for writing data on the optical disc and a system controller for managing control to verify the recordable optical disc having data recorded by the write processing unit by a reproducing system conforming to the standard for the replay-only optical disc. The recordable optical disc is verified by the reproducing system for the replay-only optical disc.

4 Claims, 6 Drawing Sheets

FIG.6

OPTICAL DISC RECORDING METHOD AND RECORDING AND/OR REPRODUCING APPARATUS OPERABLE TO ACCOMMODATE MULTIPLE DISC FORMATS

CROSS-REFERENCE TO RELATED APPLICATION

This application is a divisional of U.S. application Ser. No. 09/789,067, filed Feb. 20, 2001, now U.S. Pat. No. 6,621,776.

BACKGROUND OF THE INVENTION

1. Field of the Invention

This invention relates to a recording method for recording data on an optical disc and a recording and/or reproducing apparatus for recording and/or reproducing data on or from an optical disc.

2. Description of Related Art

Heretofore, an optical disc called a DVD (digital versatile disc) is furnished as an optical disc convenient for multi-media usage. In this optical disc, the recording capacity is appreciably increased due to the small pitch of the recording track or the data compression technique.

This optical disc copes with a wide field of application encompassing video data, audio data or computer data. This optical disc is used as a replay-only data recording medium in which data is formed as pits. This optical disc is called a DVD-ROM.

There has also been furnished an interchangeable recordable optical disc which can be reproduced on a reproducing apparatus adapted to cope with this optical disc. Specifically, the formats for a DVD+RW (DVD+Rewritable), DVD−RW (DVD-Rewritable) and DVD-R (DVD-Recordable) on which data can be recorded only once.

In recording and/or reproducing these optical discs, tracking error signals indicating the deviation from the recording track of a converging point of the laser light are generated to follow the recording tracks or row of pits carrying the recorded data.

The tracking error signals are generated in accordance with the three spot system, differential push-pull PPP system or the differential phase detection DPD system. Specifically, the tracking error signals are generated based on detection signals obtained by a light receiving section 101 shown in FIG. 1.

Figure 1:
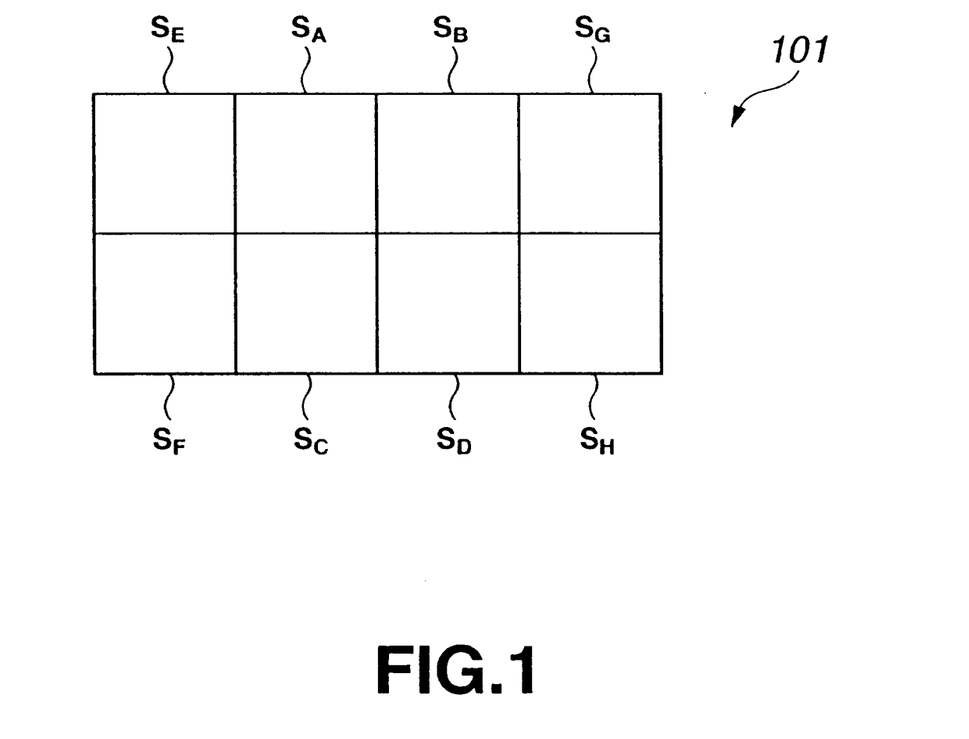
FIG. 1 shows a structure of a photodetector.

The light receiving section 101 is made up of four split areas $S_A$, $S_B$, $S_C$ and $S_D$ and two areas each split into two, namely areas $S_E$, $S_F$, $S_G$ and $S_H$.

The light receiving section 101 is provided on an optical pickup facing the signal recording surface of the optical disc, and is fed with the reflected laser light from the optical disc. From the respective areas $S_A$, $S_B$, $S_C$, $S_D$, $S_E$, $S_F$, $S_G$ and $S_H$ of the light receiving section 101 are output RF signals A, B, C, D, E, F, G and H associated with the received light quantities.

In the three-spot system, the laser light is split using a diffraction grating to generate three spots along a recording track formed on a signal recording surface of the optical disc. The tracking error signals $TE_{3SP}$ of the three spot system are generated by operational processing of $$TE_{3SP}=(E+F)-(G+H).$$

Figure 2:
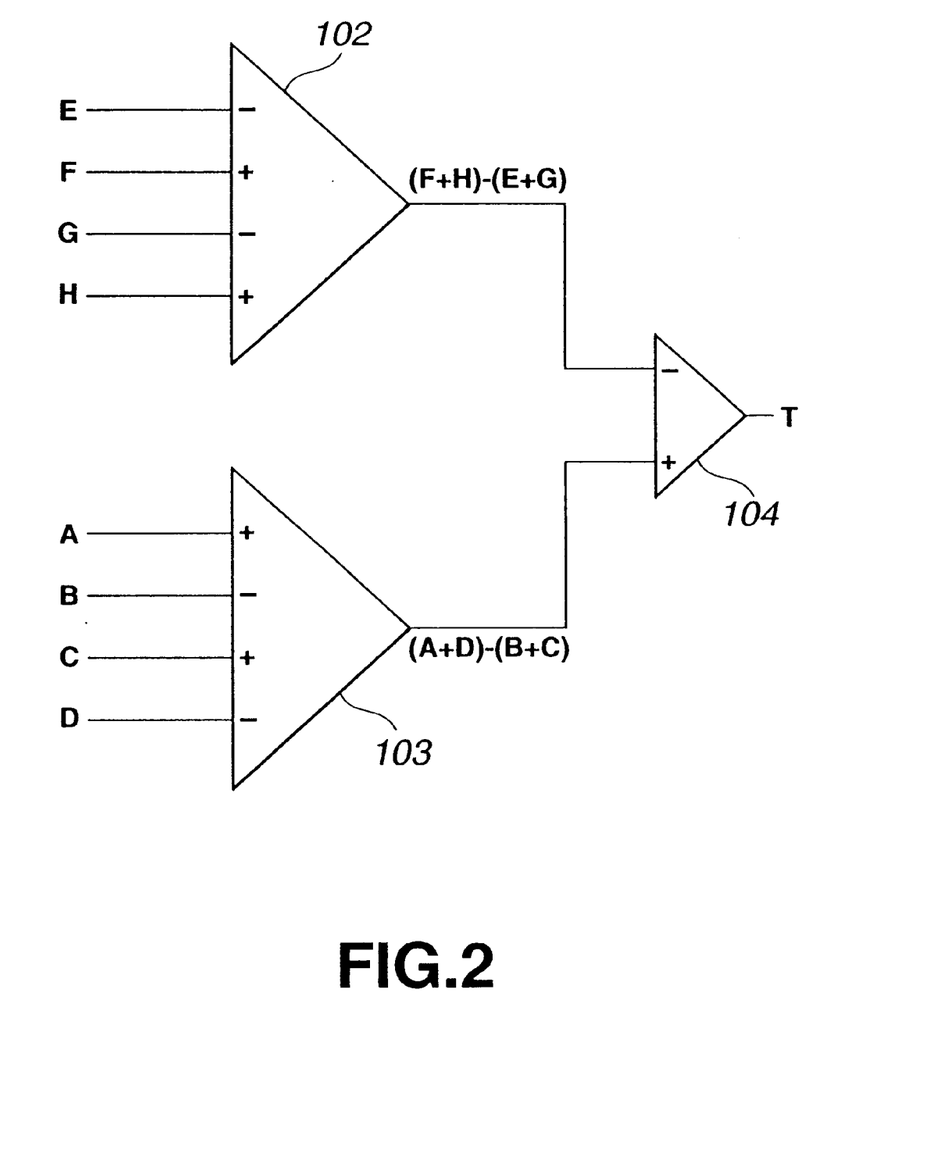
FIG. 2 is a circuit diagram for detecting tracking error signals by the DPP.

In the DPP system, the laser light illuminated on an optical disc is split using a diffraction grating to generate three spots along the recording track formed on the signal recording surface of the optical disc. In the DPP system, tracking error signals $TE_{DPP}$ are generated by a circuit shown in FIG. 2. In this circuit, the tracking error signals $TE_{DPP}$ are generated by operational processing:

$$TE_{DPP}=\{(A+D)-(B+C)\}-\{(F+H)-(E+G)\}.$$

That is, the result of an operation (F+H)−(E+G) is calculated from the signals E, F, G and H in a first difference taking unit 102, whilst the result of an operation (A+D)−(B+C) is calculated from the signals A, B, C and D in a second difference taking unit 104. The aforementioned tracking error signals $TE_{DPP}$ is calculated from the results of the above operational processing.

In the DPD system, the tracking error signals are generated on reception of the laser light radiated towards and reflected back from the pits on the optical disc.

Figure 3:
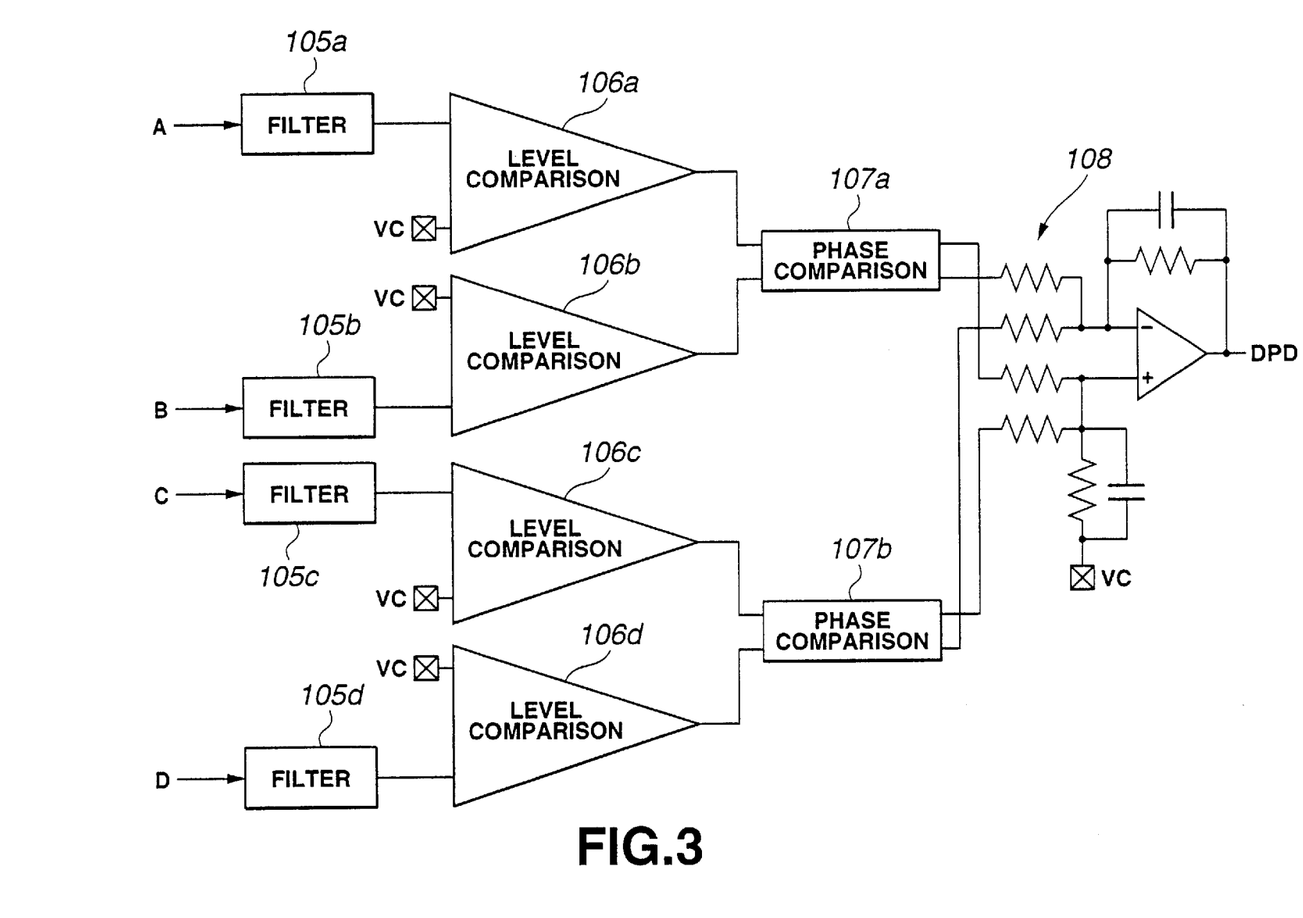
FIG. 3 is a circuit diagram of a circuit adapted for detecting tracking error signals by the DDP.

In the DPD system, the tracking error signals $TE_{DPD}$ are generated by a circuit shown in FIG. 3. In this circuit, the signals A, B, C and D from the light receiving section 101 are filtered by filters 105a, 105b, 105c and 105d and made into a bi-level signal on level comparison to a reference potential $V_C$ in comparators 106a, 106b, 106c and 106d.

The results of comparison in the level comparators 106a, 106b are phase-compared in a phase comparator 107a, whilst the results of comparison in the level comparators 106c, 106d are phase-compared in a phase comparator 107b. The results of comparison in these phase comparators 107a, 107b are integrated by an integrating circuit 108 to give the tracking error signals $TE_{DPD}$.

Figure 4:
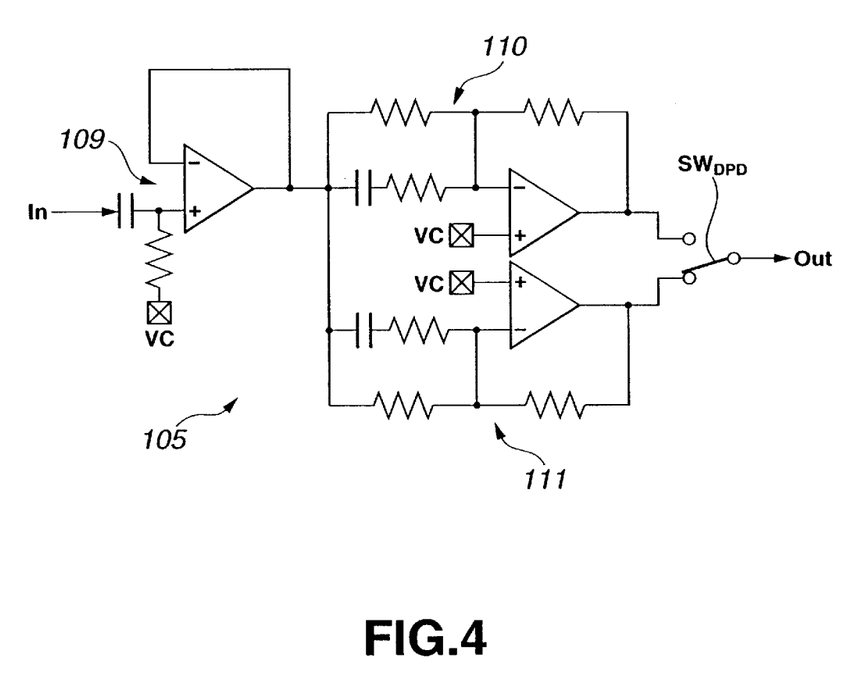
FIG. 4 is a circuit diagram of a circuit adapted for detecting tracking error signals by the circuit shown in FIG. 3.

The filters 105a, 105b. 105c and 105d are made up of a high-pass filter HP109 for cutting off dc components and two band-pass filters 110, 111 for amplifying EFM signal components.

Figure 5:
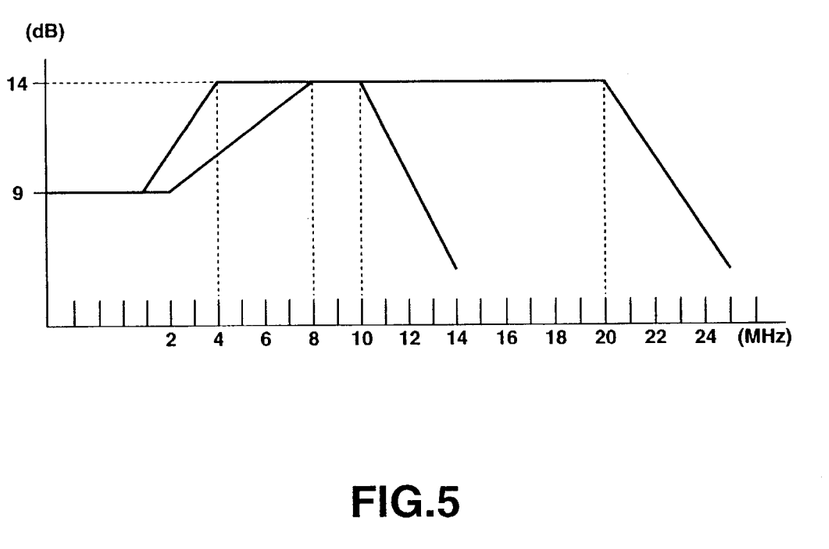
FIG. 5 shows characteristics of the circuit of FIG. 4.

The outputs of the band-pass filters 110, 111 are of different frequency response, as shown in FIG. 5. An output selection switch $SW_{DPD}$ switches between these outputs.

In capturing data from the optical disc, tracking error signals by the DPD system are used. The DPD system has been selected as giving the best signal in consideration of the offset or tilt of the optical disc and the lens movement.

Meanwhile, a recording apparatus adapted for coping with a recordable optical disc, such as DVD+RW, DVD−RW or DVD-R, data are recorded so that the data will be reproduced by a reproducing apparatus adapted for coping with a replay-only optical disc, such as DVD-ROM.

This recording apparatus applies the servo, such as tracking servo or focussing servo to the recordable optical disc, in its non-recorded state, to generate the timing for recording. Since no pits are formed in an optical disc in which no data has been recorded, the aforementioned recording apparatus controls the servo in a manner different from the aforementioned reproducing apparatus, that is with the use of a method for generating tracking error signals using a recording track. Moreover, the recording apparatus generates the timing for recording the data using signals not detectable by the aforementioned reproducing apparatus, such as wobbling of the grooves formed as recording tracks.

The aforementioned reproducing apparatus generates tracking error signals in accordance with the DPD system of detecting the reflected light from the pits recorded on the replay-only optical disc. From the reproduced data, synchronization signals are detected by the PLL (phase-locked loop) to generate the timing signals pertinent to reproduction.

On the other hand, the recording apparatus generates tracking error signals from the recording track in accordance with the DPP system. The data write timing is acquired using an ADIP (address in pre-groove) signal, recorded by modulating the groove of the recording track at a low speed, followed by wobbling, and also using fine clock marks, obtained on high-speed modulation. Meanwhile, this timing can be used not only during recording but also during reproduction.

In light of the above, it may be an occurrence that a recordable optical disc, on which data has been recorded by the above-described recording apparatus, cannot be reproduced by the above-mentioned reproducing apparatus adapted for coping with the replay-only optical disc. For example, assume that there is portion of the recordable optical disc, if small, in which pits have not been recorded appropriately. With the aforementioned recording apparatus, there is raised no particular problem if the unreadable portion is in a range of possible error correction, even though the portion cannot be read correctly. However, there may be an occasion where tracking error signals are generated by the DPP method by the presence of the groove, but the generation of the tracking error signals by the DPD method becomes difficult to disable the servo control and the readout of such portion.

The same applies for the timing. That is, in the aforementioned recording apparatus, timing compensation becomes possible by the timing generated by ADIP or ATIP even though timing generation cannot be made by the signal from the pits recorded and/or reproduced, whereas, in the aforementioned reproducing apparatus, such compensation is not possible, thus again disabling the readout.

In particular, in a format of a recordable optical disc, or a so-called DVD–RW format, there are link portions where pits are not necessarily formed satisfactorily due to material flow or laser power adjustment. The possibility of occurrence of such a phenomenon that the timing is not generated satisfactorily in this portion with the signals from the pits is not that low.

Stated differently, it is possible with the aforementioned recording apparatus to adjust the data extraction timing by taking advantage of the groove wobbling information. However, the reproducing apparatus is able to reproduce only the timing information derived from the recorded data.

In the so-called DVD-R or DVD–RW, there in no link portion, however, the above-mentioned phenomenon is still liable to occur from time to time.

Of course, data is recorded on the recordable optical disc under a pre-set condition which is determined to present no problem on reproduction by the aforementioned reproducing apparatus. Nevertheless, there is still a possibility that the above-described phenomenon occurs due to a variety of recording conditions and operational disturbances.

That is, there is a risk that an optical disc, on which recording has been made by the aforementioned recording apparatus adapted for coping with the recordable optical disc, cannot be reproduced correctly by the aforementioned respective apparatus adapted for coping with the replay-only optical disc.

SUMMARY OF THE INVENTION

It is therefore an object of the present invention to provide a recording method and apparatus for recording data on a recordable optical disc so that the data will be reproduced reliably by a reproducing apparatus adapted for coping with the replay-only optical disc.

In one aspect, the present invention provides a recording method in which a data readout system for a recordable optical disc differs from a data readout system for a replay-only optical disc, in which the method includes a recording step for recording data on the recordable optical disc and a verifying step of reading out the recordable optical disc having data recorded thereon in the recording step by a data readout system conforming to the standard for the replay-only optical disc for verification.

In another aspect, the present invention provides a recording and/or reproducing apparatus in which a data readout system for a recordable optical disc differs from a data readout system for a replay-only optical disc, in which the apparatus includes recording means for recording data on the recordable optical disc and readout means for reading out the recordable optical disc having data recorded thereon by the recording means by a data readout system conforming to the standard for the replay-only optical disc.

According to the present invention, in recording by a recording apparatus adapted for coping with a recordable optical disc, such as DVD+RW or DVD-R, the reproducing system in verifying pits of recorded data is adapted to the reproducing system adapted to cope with the replay-only optical disc, such as the DVD-ROM.

According to the present invention, the optical disc on which data has been recorded by a recording apparatus adapted to cope with a recordable disc, such as DVD+RW, can be reliably reproduced by a reproducing apparatus adapted to cope with the replay-only optical disc, such as DVD-ROM. Moreover, according to the present invention, since it is unnecessary to add a new circuit to the recording apparatus adapted to cope with the replay-only optical disc, such as DVD-ROM, there is no risk of raising the cost.

DESCRIPTION OF THE PREFERRED EMBODIMENTS

Referring to the drawings, preferred embodiments of the present invention will be explained in detail.

An optical disc device for recording and/or reproducing data on or from an optical disc, embodying the present invention, is hereinafter explained.

This optical disc device is adapted for coping with a disc which permits data recording and/or reproduction, such as DVD+RW, and a replay-only disc, such as DVD-ROM. That is, this optical disc device records data on an optical disc device that enables data recording and/or reproduction, while reproducing data from a replay-only disc. From the disc DVD–RW, having data recorded thereon, data is reproduced in the same way as from the replay-only optical disc DVD-ROM.

In recording data on a disc that permits data recording and/or reproduction (DVD+RW), the present optical disc device generates tracking error signals in accordance with the DPP system to control the tracking servo. In reproducing data from the relay-only disc (DVD-ROM), the present optical disc device generates tracking error signals in accordance with the DPD system.

This optical disc device records data on the DVD+RW capable of recording and/or reproducing data and subsequently verifies in accordance with the data readout system for the DVD-ROM as the replay-only disc in order to confirm the data recording state. That is, the tracking error signals are generated in accordance with the DPD system by exploiting the pits of the recorded data. Meanwhile, the verification operation for confirming the data recording state is performed directly after data recording as a portion of the sequence of recording operations.

This verification assures that the DVD-RW, having data recorded thereon, are reproduced by a reproducing apparatus adapted for coping with the DVD-ROM.

Figure 6:
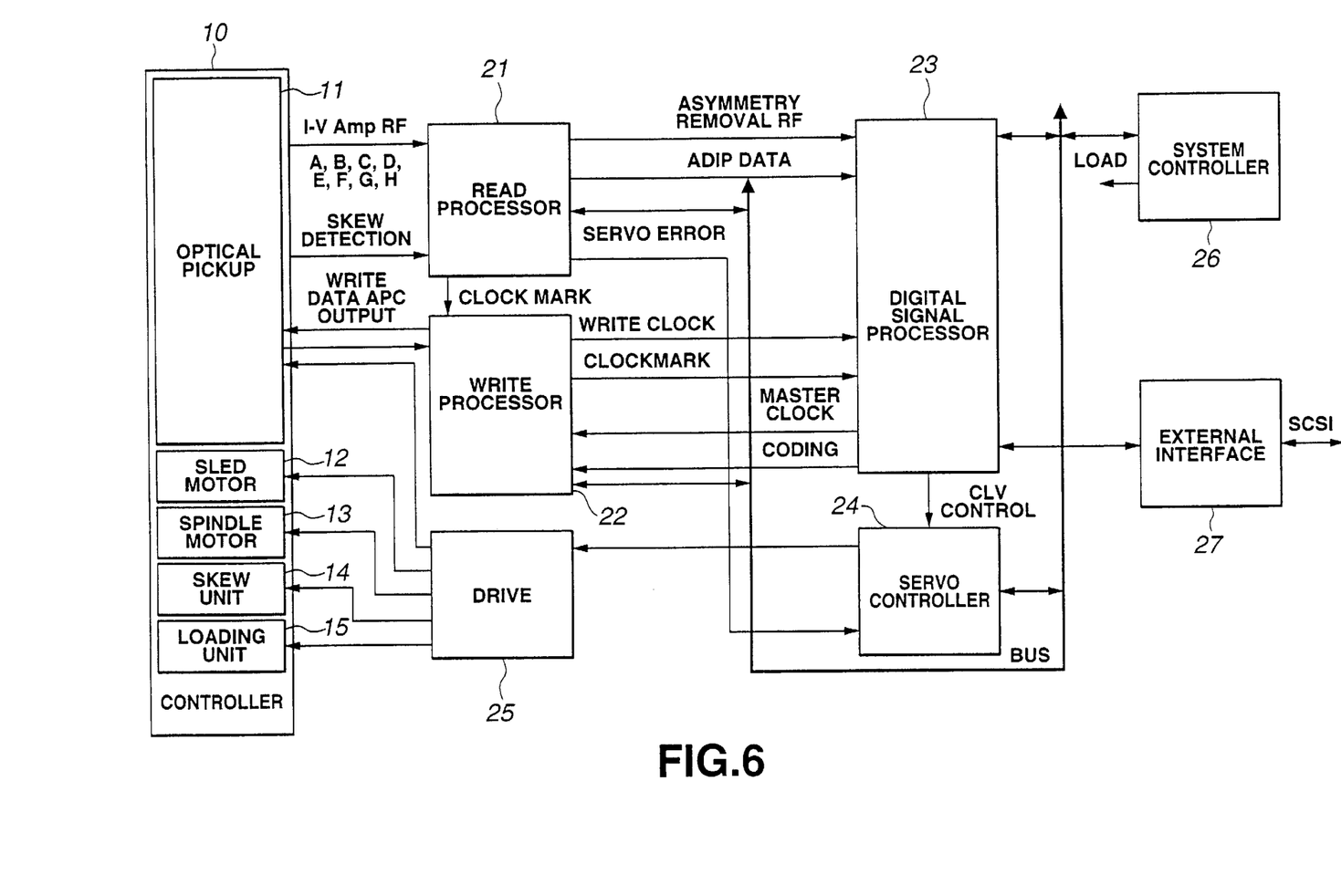
FIG. 6 is a schematic view block diagram showing a structure of an optical disc device.

Referring to FIG. 6, the optical disc device includes a mechanism 10 having an optical pickup 11 for illuminating the laser light on an optical disc for receiving the reflected light, a sled motor 12 for causing movement of the optical pickup 11 along the radius of the optical disc, a spindle motor 13 for rotationally driving the optical disc, a skew unit 14 for skewing the optical pickup 11 responsive to the tilt of t the optical disc and a loading unit 15 for loading the optical disc.

The optical pickup 11 includes a laser diode for emitting the laser light, a light collecting lens for collecting the laser light emitted by the laser diode on the optical disc and a light receiving unit for receiving the reflected light from the optical disc obtained via light collecting lens.

The sled motor 12 feeds the optical pickup 11 along the radius of the optical disc depending on the position on the optical disc of the optical pickup 11 performing recording and/or reproduction by the laser light.

The spindle motor 13 rotationally drives the optical disc at a pre-set speed relative to the spot on the optical disc of the laser light illuminated from the optical pickup 11.

The skew unit 14 tilts the optical pickup 11 responsive to the tilt caused by the warp of the optical disc to adjust the optical axis of the laser light so that the optical axis of the laser light will be perpendicular with respect to the optical disc.

The loading unit 15 loads the optical disc carried by the optical-disc device so that the optical disc will be run in rotation by the spindle motor 13 to enable the recording and/or reproduction by the optical pickup 11.

The mechanism 10, made up of the above components, is mounted on a sub-chassis of the optical disc device.

The optical disc device includes a readout processing unit 21 for processing signals read out by the optical pickup 11 from the optical disc and a writing processing unit 22 for processing signals written on the optical disc.

The readout processing unit 21 performs readout processing of information signals from the optical disc based on the RF signals sent from the optical pickup and skew detection signals.

The readout processing unit 21 is fed from the optical pickup 11 with RF signals A, B, C, D, E, F, G and H, obtained on converting the received light quantities in the areas $S_A$, $S_B$, $S_C$, $S_D$, $S_E$, $S_F$, $S_G$ and $S_H$ of the light receiving section, and with skew detection signals corresponding to detected skew of the optical disc.

The readout processing unit 21 performs level equalization and automatic gain control (AGC) on RF signals, servo error detection, push-pull signal generation, clock mark signal detection, ADIP (address in pre-groove) demodulation and skew detection signal amplification.

The ADIP is the information such as addresses recorded on wobbling the pre-grooves formed as recording tracks in the pre-grooves. It is noted that, if the information such as address signals are recorded as ATIP (absolute time in pre-groove) signals in place of ADIP signals on wobbling in the pre-groove, these ATIP signals are demodulated.

The readout processing unit 21 sends asymmetry-freed RF signals and the ADIP data to a digital signal processing unit 23. The readout processing unit 21 sends clock mark signals and servo error signals to a write controller 22 and to a servo controller 24, respectively. The servo error signals comprehend tracking error signals and focussing error signals.

As the tracking error signals, the DPP system and the DPD system are used for the recording and/or reproduction for a disc used for data recording and/or reproduction (DVD+RW) and for reproduction from a replay-only disc (DVD-ROM), respectively.

The readout processing unit 21 includes a circuit for generating tracking error signals using the DPP system, and a circuit for generating tracking error signals using the DPD system. The control signal from a system controller 26 is used for switching between these two circuits.

For verification used for a sequence of recording operations for a DVD-RW which permits data recording and/or reproduction, tracking error signals of the DVD system adapted for coping with the replay-only disc (DVD-ROM) are used.

The optical disc device includes a reproducing circuit by the DPD system associated with the replay-only disc DVD-ROM. So, this reproducing circuit may be used for verification.

The write controller 22 writes information signals for an optical disc based on the 8/16 encoding signals sent from the digital signal processing unit 23.

The write controller 22 is fed with clock mark signals from the readout processing unit 21, while being fed with master clock signals and 8/16 encoding signals from the digital signal processing unit 23 and with front monitor signals of the optical pickup 11.

The write controller 22 synthesizes write clock signals based on the master clocks and generates write pulses from the 8/16 encoding signals to perform automatic power control (APC) of the laser light in the optical pickup.

The write controller 22 routes write data for driving the laser diode and an automatic power control signal to the optical pickup 11. The write controller 22 routes write clock signals and clock mark signals to the digital signal processing unit.

The optical disc device includes a digital signal processing unit 23 for processing read-out signals from the readout processing unit 21 and write signals to be routed to the write controller 22.

The digital signal processing unit 23 mainly performs the processing of encoding/decoding information signals read out form the optical disc and routed from the writing processing unit 22 and information signals to be sent to the write controller 22 for writing on the optical disc.

The digital signal processing unit 23 is fed from the readout processing unit 21 with asymmetry-freed RF signals, while being fed from the write controller 22 with write clock signals. The digital signal processing unit 23 performs channel processing based on these signals, namely the read-out channel PLL, 8/16 modulation decoding, data compensation and RS-PC (Reed-Solomon product Code) decoding.

Simultaneously, a CLV (constant linear velocity) control signal for the optical disc is obtained and routed to the servo controller 24.

Meanwhile, the above write clocks are not used for the above processing during data verification.

The digital signal processing unit 23 is fed with data and with ADIP data from an external interface 27 and from the read-out unit 21, respectively, while being fed with write clock signals and clock mark signals from the write controller 22. The digital signal processing unit 23 performs data processing based on these signals, namely the RS-PC (Reed-Solomon product code) encoding, ID (identifier) processing, 8/16 encoding and wobble decoding.

The data writing timing is obtained by ADIP obtained on low-speed modulation of the wobbling of the groove of the recording track and by fine clock marks modulated at a high speed. Meanwhile, this timing may be used not only during recording but also during reproduction.

The digital signal processing unit 23 routes the 8/16 encoded information signals to the write controller 22, while generating master clocks based on clock signals generated by a quartz oscillator to route the generated master clocks to the write controller 22.

The servo controller 24 includes a servo, controller 24 for performing servo control on the mechanism 10 and a driving unit 25 for driving the mechanism 10 based on a control signal from the servo controller 24.

The servo controller 24 drives the driving unit 25, based on the servo error signal from the readout processing unit 21 and on the CLV control signal from the digital signal processing unit 23, by way of controlling the mechanism 10.

The servo controller 24 performs control based on these signals, namely focussing servo for driving the light collecting lens of the optical pickup 11 along the optical axis of the lens, tracking servo for controlling the spot of the laser light collected by the light collecting lens to follow the recording track, sled servo for driving the sled motor 12 for causing movement of the optical pickup 11 along the radius of the optical disc, and spindle servo for controlling the optical disc rotation by the spindle motor 13.

The driving unit 25 drives various components of the mechanism 10 based on the control signal from the servo controller 24. That is, the driving unit 25 drives the optical pickup 11, sled motor 12, specifying 13, skew unit 14 and the loading unit 15.

The optical disc device includes the system controller 26 for controlling various components of this optical disc device, and the external interface 27 for interfacing between the optical disc device and the outside.

The system controller 26 controls the respective portions of the optical disc device in accordance with a pre-set sequence. The system controller 26 may, for example, be formed as a micro-controller having a CPU, a ROM and a RAM.

The system controller 26 manages control for the recordable disc DVD+RW so that, if a request is made for verification of data recorded thereon, data will be read out in accordance with the readout system for the replay-only disc DVD-ROM for verification.

Specifically, the system controller 26 manages control so that tracking error signals of the DPP system will be used in recording on the recordable disc DVD+RW, and so that, in verification, tracking error signals of the DPD system as used in reproduction from the replay-only disc DVD-ROM will be used under utilization of the recorded data pits. This enables the recordable disc DVD+RW to be reliably reproduced even by a reproducing apparatus adapted for coping with the replay-only disc DVD-ROM.

The system controller 26 is able to perform switching control for generating tracking error signals using the DPP system instead of using the DPD system for the recordable disc DVD+RW. This enables the tracking error signals similar to those used for recording to be used to achieve reliable reproduction of the recordable disc DVD+RW.

In reproducing the recordable disc DVD-RW, the system controller 26 uses the information proper to the recordable optical disc obtained on wobbling the groove. However, in data verification, the system controller 26 is able to use only the information obtained from a replay-only disc DVD-ROM for reproduction.

The external interface transmits/receives data between the optical disc device and the external host computer. The communication between the external interface 27 and the host computer is e.g., by so-called SCSI (small computer serial interface).

Meanwhile, the readout processing unit 21, write controller 22, digital signal processing unit 23, servo controller 24, driving unit 25, system controller 26 and the external interface 27 transmit/receive data over bus 28.

In the above-described embodiment, the description has been centered about reproducing the recordable disc DVD+RW by a reproducing apparatus adapted for coping with the replay-only disc DVD-ROM. It is however possible to cope with other discs of the formats of the recordable disc, such as DVD-RW or DVD. Moreover, the concept of the present invention may be directly applied to an environment where the replay-only disc/drive other than DVD and the recordable disc/drive co-exist, should there be any.

There may be such an occasion where there is no necessity of assuring reproduction of the recorded disc on the so-called DVD-ROM drive. So, reproduction by the so-called DVD-ROM system in the entire verification is unnecessary, such that the verification system may be switched as necessary. It may also be contemplated to allocate a command for usual verification on the system control side which is separated from a command for verification in accordance with the so-called DVD-ROM system. This system controller may be a host computer. Also, in the present embodiment, the description has been made of the generation of tracking error signals. However, the present invention may also be applied to the generation of the focussing error signals in meeting with the properties of the optical disc used.

What is claimed is:

1. A recording and/or reproducing apparatus in which a data readout system for a recordable optical disc differs from a data readout system for a replay-only optical disc, said apparatus comprising:

an optical head for illuminating the laser light towards the optical disc to record data thereon and for detecting the reflected light from said optical disc;

a readout processing unit for processing signals detected by said optical head; and write processing unit for controlling data writing on the recordable optical disc by said optical head;

said readout processing unit being operable to selectively switch between two operations, a first operation that corresponds to the recordable optical disc and employs a first tracking error signal process, and a second operation that corresponds to the replay-only optical disc and employs a second tracking error signal process;

whereby said read-out processing unit employs said first operation when data is being recorded by said optical head on the recordable optical disc and employs said second operation when data recorded on said recordable optical disc by said optical head is being verified.

2. The recording and/or reproducing apparatus according to claim 1 wherein said read-out processing unit employs said first operation when data is being recorded by said optical head on the recordable optical disc and wherein said read-out processing unit employs said first operation or said second operation when the data recorded on said optical disc by said optical head is being verified.

3. The recording and/or reproducing apparatus according to claim 1 wherein said read-out processing unit generates tracking error signals by the push-pull method in said first operation and generates tracking error signals by the difference phase detection method in said second operation.

4. The recording and/or reproducing apparatus according to claim 1 wherein recordable recording tracks are formed at the outset in said recordable optical disc and wherein pits as data are formed in said replay-only optical disc.

* * * * *